United States Patent
He

(10) Patent No.: US 10,727,881 B1
(45) Date of Patent: Jul. 28, 2020

(54) WIRELESS SIGNAL INTERFERENCE REDUCTION DEVICE AND METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Hao He, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/542,437

(22) Filed: Aug. 16, 2019

(30) Foreign Application Priority Data

Jul. 9, 2019 (CN) .......................... 2019 1 0618732

(51) Int. Cl.
| | |
|---|---|
| *H04B 1/04* | (2006.01) |
| *H04B 1/10* | (2006.01) |
| *H04L 5/00* | (2006.01) |
| *H04W 52/24* | (2009.01) |
| *H04B 17/336* | (2015.01) |

(52) U.S. Cl.
CPC ......... *H04B 1/0475* (2013.01); *H04B 1/1027* (2013.01); *H04B 17/336* (2015.01); *H04L 5/006* (2013.01); *H04W 52/243* (2013.01); *H04W 52/245* (2013.01); *H04W 52/248* (2013.01)

(58) Field of Classification Search
CPC .. H04B 1/0475; H04B 1/1027; H04B 17/336; H04L 5/006; H04W 52/243; H04W 52/245; H04W 52/248
See application file for complete search history.

(56) References Cited

U.S. PATENT DOCUMENTS

| | | | | |
|---|---|---|---|---|
| 3,578,914 A | * | 5/1971 | Simonelli | ......... H04L 25/03878 370/284 |
| 3,831,093 A | * | 8/1974 | Walker | .................... H04B 7/082 455/237.1 |
| 3,845,397 A | * | 10/1974 | Schulz | .................... G01R 19/04 327/70 |
| 6,011,435 A | * | 1/2000 | Takeyabu | ............ H03F 3/45475 330/252 |
| 6,597,395 B1 | * | 7/2003 | Kim | ........................ H04N 5/18 348/222.1 |

(Continued)

*Primary Examiner* — James M Perez
(74) *Attorney, Agent, or Firm* — ScienBiziP, P.C.

(57) ABSTRACT

A wireless signal interference reduction device includes a digital signal converter, an output device, a first adjustable resistor, and a second adjustable resistor. The wireless signal interference reduction device records an initial SNR value, records an SNR value of wireless reception in real-time at a preset interval when wired data transmission is turned on, determines whether a difference between the initial SNR value and the real-time SNR value is less than a preset value, continuously obtains the real-time SNR value at the preset interval to obtain the difference between the initial SNR value and the real-time SNR value if the difference between the initial SNR value and the real-time SNR value is less than the preset value, and reduces the wired transmission bandwidth by one step value if the difference between the initial SNR value and the real-time SNR value is not less than the preset value.

18 Claims, 3 Drawing Sheets

(56) References Cited

U.S. PATENT DOCUMENTS

| | | | |
|---|---|---|---|
| 6,940,539 B1* | 9/2005 | Tokman | H04N 5/23203 330/302 |
| 7,756,059 B1* | 7/2010 | Bharghavan | H04L 47/10 370/252 |
| 7,826,549 B1* | 11/2010 | Aggarwal | H03C 1/60 332/170 |
| 8,456,993 B1* | 6/2013 | Bharghavan | H04L 47/10 370/232 |
| 8,538,368 B1* | 9/2013 | Campbell | H04B 1/1027 455/127.1 |
| 8,810,976 B2* | 8/2014 | Cao | H02H 3/08 361/15 |
| 8,958,334 B2* | 2/2015 | Bharghavan | H04L 47/10 370/252 |
| 8,958,504 B2* | 2/2015 | Warke | H04L 27/0014 375/235 |
| 9,008,168 B2* | 4/2015 | Miller | H04N 5/268 375/232 |
| 9,118,294 B2* | 8/2015 | Mochizuki | H04W 52/0245 |
| 9,300,461 B2* | 3/2016 | Akita | H03L 7/087 |
| 9,520,955 B2* | 12/2016 | Li | H03G 3/3078 |
| 9,544,864 B1* | 1/2017 | Takahashi | H04W 56/0015 |
| 9,654,310 B1* | 5/2017 | Chang | H03H 15/02 |
| 9,722,822 B1* | 8/2017 | Zhang | H04L 25/03343 |
| 9,729,119 B1* | 8/2017 | Blatz | H03G 3/3036 |
| 9,787,505 B2* | 10/2017 | Lim | H04L 25/03057 |
| 9,800,279 B2* | 10/2017 | Gore | H04B 1/16 |
| 9,929,760 B2* | 3/2018 | Chu | H04B 1/1036 |
| 10,158,336 B2* | 12/2018 | Blatz | H03G 3/3036 |
| 10,278,143 B2* | 4/2019 | Kam | H03F 1/0211 |
| 10,397,819 B2* | 8/2019 | Bejerano | H04L 1/003 |
| 2003/0020552 A1* | 1/2003 | Troy | H03L 7/183 331/34 |
| 2003/0025514 A1* | 2/2003 | Benes | G01R 19/0092 324/713 |
| 2003/0210035 A1* | 11/2003 | Manlove | G01D 3/02 324/166 |
| 2005/0179473 A1* | 8/2005 | Nagahori | H04L 5/1423 327/110 |
| 2005/0198687 A1* | 9/2005 | Miller | H04M 11/066 725/127 |
| 2007/0081615 A1* | 4/2007 | Khoini-Poorfard | H03G 3/3068 375/345 |
| 2008/0056413 A1* | 3/2008 | Demir | H03G 3/3068 375/345 |
| 2008/0092205 A1* | 4/2008 | Miller | H04M 11/066 725/149 |
| 2008/0186407 A1* | 8/2008 | Miller | H04N 5/268 348/705 |
| 2009/0002066 A1* | 1/2009 | Lee | H03H 15/02 327/554 |
| 2009/0146799 A1* | 6/2009 | Goldstein | B60Q 5/00 340/463 |
| 2009/0170445 A1* | 7/2009 | Wang | H03J 3/08 455/77 |
| 2010/0086088 A1* | 4/2010 | Lie | H04B 1/7117 375/346 |
| 2010/0171659 A1* | 7/2010 | Waters | G01S 19/34 342/357.74 |
| 2011/0222623 A1* | 9/2011 | Hollis | H04L 25/0278 375/295 |
| 2013/0099797 A1* | 4/2013 | Quemerais | H03F 1/565 324/614 |
| 2013/0107399 A1* | 5/2013 | Cao | H02H 7/16 361/15 |
| 2013/0301443 A1* | 11/2013 | Bharghavan | H04L 47/10 370/252 |
| 2014/0126665 A1* | 5/2014 | Lee | H04B 1/1607 375/295 |
| 2014/0133606 A1* | 5/2014 | Mochizuki | H04W 52/0245 375/340 |
| 2015/0149678 A1* | 5/2015 | Kim | H04L 25/03885 710/302 |
| 2015/0270913 A1* | 9/2015 | Li | H04B 17/318 455/115.3 |
| 2016/0241424 A1* | 8/2016 | Craninckx | H04B 1/0483 |
| 2016/0309535 A1* | 10/2016 | Myoung | H04W 72/0453 |
| 2016/0330750 A1* | 11/2016 | Lee | H04L 5/0023 |
| 2017/0207803 A1* | 7/2017 | Garrett | H04B 1/1027 |
| 2017/0346464 A1* | 11/2017 | Chang | H03L 1/00 |
| 2017/0366993 A1* | 12/2017 | Bejerano | H04L 5/006 |
| 2018/0062240 A1* | 3/2018 | Nardelli | H01Q 1/2216 |
| 2018/0184388 A1* | 6/2018 | Kam | H03F 1/0211 |
| 2018/0198473 A1* | 7/2018 | Cook | H04L 27/0002 |
| 2018/0226367 A1* | 8/2018 | Babcock | H03F 3/195 |

* cited by examiner

WIRELESS SIGNAL INTERFERENCE REDUCTION DEVICE AND METHOD

FIELD

The subject matter herein generally relates to wireless signal reduction, and more particularly to a wireless signal interference reduction device and method.

BACKGROUND

In wireless electronic devices, as speed of digital buses increases, digital signals have higher interference on wireless reception. Currently, it is difficult to dynamically reduce interference by digital signals on wireless reception.

BRIEF DESCRIPTION OF THE DRAWINGS

Implementations of the present disclosure will now be described, by way of embodiments, with reference to the attached figures.

DETAILED DESCRIPTION

Figure 1:
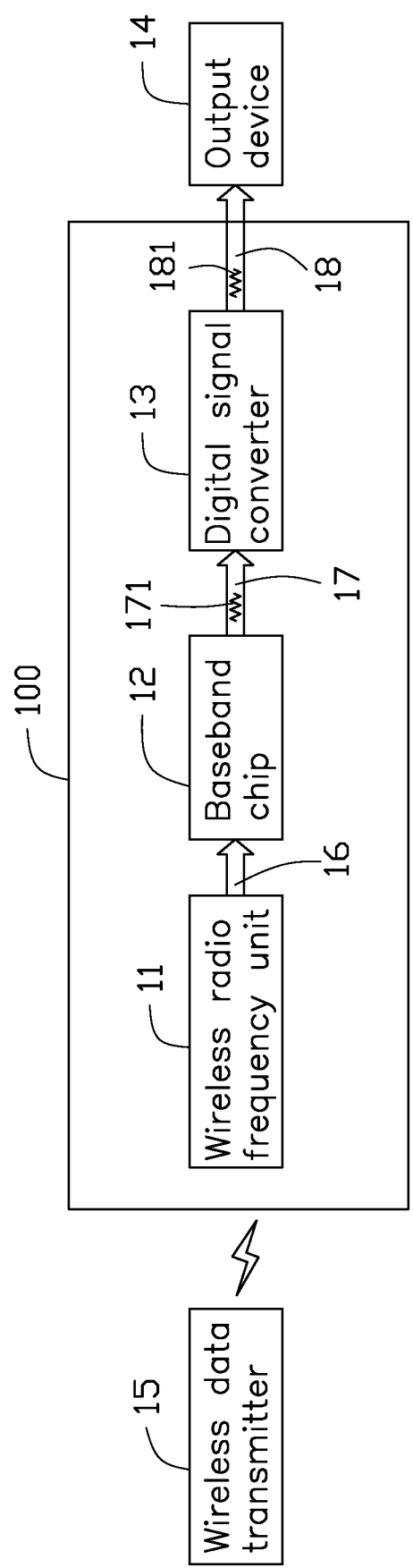
FIG. 1 is a block diagram of an embodiment of a wireless signal interference reduction device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows an embodiment of a wireless signal interference reduction device 100 for reducing wireless signal transmission interference.

The wireless signal interference reduction device 100 includes a wireless radio frequency unit 11, a baseband chip 12, a digital signal converter 13, and an output device 14. A wireless data transmitter 15 transmits a wireless signal through a wireless transmission channel to the wireless radio frequency unit 11, and the wireless radio frequency unit 11 converts the wireless signal into a wired digital signal and transmits the wired digital signal to the baseband chip 12 through a baseband signal bus 16. The baseband chip 12 demodulates the wired digital signal and transmits the demodulated wired digital signal to the digital signal converter 13 through a data bus 17. A first adjustable resistor 171 is coupled in series on the data bus 17 between the baseband chip 12 and the digital signal converter 13. The digital signal converter 13 transmits the wired digital signal through an output bus 18 to the output device 14. A second adjustable resistor 181 is coupled in series on the output bus 18 between the digital signal converter 13 and the output device 14.

Figure 2:
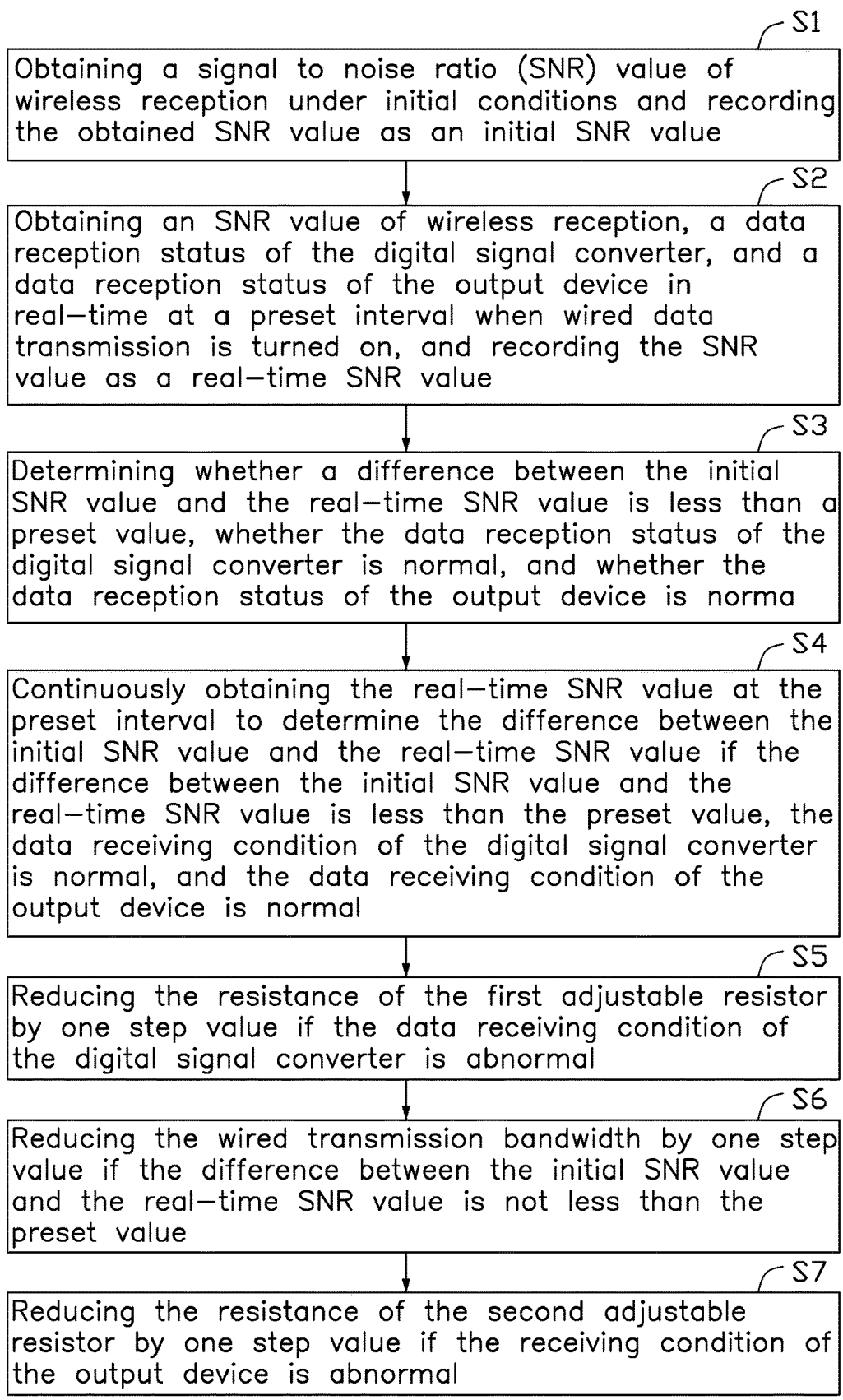
FIG. 2 is a flowchart of a wireless signal interference reduction method.

FIG. 2 shows a flowchart of a method for reducing wireless signal transmission interference. The order of blocks in the flowchart may be changed according to different requirements, and some blocks may be omitted.

At block S1, a signal to noise ratio (SNR) value of wireless reception under initial conditions is obtained and recorded as an initial SNR value.

In one embodiment, the initial conditions are described as follows.

A resistance of the first adjustable resistor 171 is such that a wired transmission error rate is lower than a maximum resistance of an industry standard of wired transmission. A resistance of the second adjustable resistor 181 is such that a wired transmission error rate is lower than a maximum resistance of an industry standard of wired transmission. A wireless transmission channel is set to a transmission channel of a lowest channel number. A wired transmission bandwidth is set to a bandwidth of a corresponding wired transmission when resistances of the first adjustable resistor 171 and the second adjustable resistor 181 are a maximum resistance.

In one embodiment, the first adjustable resistor 171 is coupled in series on the data bus 17 between the baseband chip 12 and the digital signal converter 13, and the second adjustable resistor 181 is coupled in series on the output bus 18 between the digital signal converter 13 and the output device 14.

A method of configuring the maximum resistance of the first adjustable resistor 171 is described as follows.

Initial value setting step: the channel number of wireless transmission is set to the lowest transmission channel when the first adjustable resistor 171 has a resistance of 0 and the second adjustable resistor 181 has a resistance of 0.

First receiving step: a wired transmission line where the first adjustable resistor 171 is located is opened, a wired transmission bandwidth is set to a maximum resistance, and a wired digital signal receiving condition of the digital signal converter 13 is obtained.

First determining step: whether the wired digital signal receiving condition of the digital signal converter 13 is normal is determined.

First executing step: if the wired digital signal receiving condition of the digital signal converter 13 is normal, the resistance of the first adjustable resistor 171 is increased by one step value.

Second executing step: if the wired digital signal receiving condition of the digital signal converter 13 is not normal, the resistance of the first adjustable resistor 171 is decreased by one step value and set as the maximum resistance of the first adjustable resistor 171.

Second determining step: whether the wired transmission bandwidth of the first adjustable resistor 171 is a minimum resistance is determined.

Third executing step: if the wired transmission bandwidth of the first adjustable resistor 171 is not the minimum resistance, the wired transmission bandwidth is reduced by one step value.

Fourth executing step: if the wired transmission bandwidth is the minimum resistance, the maximum resistance and the wired transmission bandwidth of the first adjustable resistor 171 are recorded.

In one embodiment, the digital signal converter 13 may be a High Definition Multimedia Interface (HDMI) digital signal converter. Whether the wired digital signal receiving condition of the digital signal converter 13 is normal is determined by a detection program of a verification module having a data detection function. The digital transmission signal of the wired transmission line is detected to determine whether the receiving condition is normal.

In another embodiment, the digital signal converter 13 may be a Video Graphics Array (VGA) digital signal converter, and whether the wired digital signal receiving condition of the digital signal converter 13 is normal is determined by a sensor.

In one embodiment, a method of configuring the maximum resistance of the second adjustable resistor 181 is described as follows.

Initial value setting step: when the first adjustable resistor 171 has a resistance of 0 and the second adjustable resistor 181 has a resistance of 0, a number of channels for wireless transmission is set to a lowest number.

First receiving step: a wired transmission line where the second adjustable resistor 181 is located is opened, and a wired transmission bandwidth is set to a maximum resistance. A wired digital signal receiving condition of the output device 14 is obtained at a maximum resistance of the first adjustable resistor 171.

First determining step: whether the wired digital signal receiving condition of the output device 14 is normal is determined.

First executing step: if the wired digital signal receiving condition of the output device 14 is normal, the resistance of the second adjustable resistor 181 is increased by one step value.

Second executing step: if the wired digital signal receiving condition of the output device 14 is not normal, the resistance of the second adjustable resistor 181 is reduced by one step value and set as a maximum resistance of the second adjustable resistor 181.

Second determining step: whether the wired transmission bandwidth of the second adjustable resistor 181 is a minimum resistance is determined.

Third executing step: if the wired transmission bandwidth of the second adjustable resistor 181 is not the minimum resistance, the wired transmission bandwidth is reduced by one step value.

Fourth executing step: if the wired transmission bandwidth of the second adjustable resistor 181 is the minimum resistance, the maximum resistance and the wired transmission bandwidth of the second adjustable resistor 181 are recorded.

In one embodiment, the output device 14 may be a display or an electronic device having a display, such as a smart phone, a tablet computer, a laptop computer, a desktop computer, or the like. The method for determining whether the wired digital signal receiving condition of the output device 14 is normal may be determined by using a sensor, or may be determined by a verification module having a data detection function.

At block S2, when wired data transmission is turned on, an SNR value of wireless reception, a data reception status of the digital signal converter 13, and a data reception status of the output device 14 are obtained in real-time at a preset interval. The SNR value is recorded as a real-time SNR value.

In one embodiment, the preset interval is 30 seconds, and the SNR value of wireless reception may be obtained through a data control interface calling program.

At block S3, whether a difference between the initial SNR value and the real-time SNR value is less than a preset value is determined, whether the data reception status of the digital signal converter 13 is normal is determined, and whether the data reception status of the output device 14 is normal is determined.

In one embodiment, the preset value is 2 dB. When the difference between the initial SNR value and the real-time SNR value is less than or equal to 2 dB, the wired digital signal has a reduced interference on the wireless signal.

At block S4, if the difference between the initial SNR value and the real-time SNR value is less than the preset value, the data receiving condition of the digital signal converter 13 is normal, and the data receiving condition of the output device 14 is normal, the real-time SNR value is continuously obtained at the preset interval to obtain the difference between the initial SNR value and the real-time SNR value.

For example, the preset value is 2 dB, the digital signal converter 13 is an HDMI digital signal converter, the output device 14 is a display, and the preset interval is 30 s. If the difference between the initial SNR value and the real-time SNR value is less than 2 dB, the wired digital signal received by the digital signal converter 13 through a first sensor is normal, the wired digital signal received by the output device 14 through a second sensor is normal, and block S3 is implemented every 30 seconds.

At block S5, if the data receiving condition of the digital signal converter 13 is not normal, the resistance of the first adjustable resistor 171 is reduced by one step value.

In one embodiment, the digital signal converter 13 is an HDMI digital signal converter. By increasing the resistance of the first adjustable resistor 171 on the wired transmission line, digital reception by the HDMI digital signal converter is affected. Thus, the resistance of the first adjustable resistor 171 on the wired transmission line is reduced by one step value.

At block S6, if the difference between the initial SNR value and the real-time SNR value is not less than the preset value, the wired transmission bandwidth is reduced by one step value.

In one embodiment, the preset value is 2 db. If the difference between the initial SNR value and the real-time SNR value is not less than 2 dB, the wired transmission bandwidth is reduced by one step value.

At block S7, if the receiving condition of the output device 14 is not normal, the resistance of the second adjustable resistor 181 is reduced by one step value.

In one embodiment, the output device 14 is a display. By increasing the resistance of the second adjustable resistor 181 on the wired transmission line, digital reception by the output device 14 is affected. Thus, the resistance of the second adjustable resistor 181 on the wired transmission line is reduced by one step value.

In one embodiment, if the resistance of the first adjustable resistor 171 and the resistance of the second adjustable resistor 181 are already the minimum resistance and if the data receiving condition of the digital signal converter 13 is not normal, the channel for wireless transmission is switched.

If the resistance of the first adjustable resistor 171 and the resistance of the second adjustable resistor 181 are already the minimum resistance and the receiving condition of the output device 14 is not normal, it is determined that the transmission line is too long or the output device 14 is faulty.

A method of configuring the minimum resistance of the first adjustable resistor 171 is described as follows.

Initial value setting step: when the first adjustable resistor 171 has a resistance of 0 and the second adjustable resistor 181 has a resistance of 0, the wired transmission line is closed, and the wireless channel of the digital signal converter 13 is set to a lowest transmission channel.

First original SNR value obtaining step: a wireless transmission output power of the wireless data transmitter 15 is adjusted, so that a received signal strength indication (RSSI) of a wireless signal received by the digital signal converter 13 is higher than a preset range of wireless reception sensitivity, and then an SNR value of the wireless signal received by the digital signal converter 13 is obtained and recorded as a first original SNR value.

In one embodiment, the wireless transmission output power of the wireless data transmitter 15 may be adjusted by controlling the output power of the wireless data transmitter 15 through a wireless channel at a wireless data receiver. An attenuator (not shown) is coupled between the wireless data transmitter and the wireless data receiver.

In one embodiment, the preset range of wireless reception sensitivity is 3-4 dB. The wireless reception sensitivity is obtained according to a design rule of the wireless signal interference reduction device 100.

First SNR value obtaining step: the wired transmission line where the first adjustable resistor 171 is located is opened, a wired transmission bandwidth is set to a maximum resistance, and an SNR value of wireless reception is obtained and recorded as a first SNR value.

First determining step: whether a difference between the first original SNR value and the first SNR value is less than or equal to a preset value is determined.

In one embodiment, the preset value is 2 dB.

First executing step: if the difference between the first original SNR value and the first SNR value is greater than the preset value, the resistance of the first adjustable resistor 171 is increased by one step value.

Second executing step: if the difference between the first original SNR value and the first SNR value is less than or equal to the preset value, the resistance of the first adjustable resistor 171 is recorded as the minimum resistance of the first adjustable resistor 171.

Second determining step: after obtaining the minimum resistance of the resistance of the first adjustable resistor 171, whether the wired transmission bandwidth is the lowest is determined.

Third executing step: if the wired transmission bandwidth is not the lowest, the wired transmission bandwidth is reduced by one step value, and the first SNR value obtaining step is repeated.

Third determining step: if the wired transmission bandwidth is the lowest, whether the channel number of wireless transmission is the highest transmission channel number is determined.

Fourth executing step: if the channel number of wireless transmission is not the highest transmission channel number, the channel number of wireless transmission is increased by one, and the first original SNR value obtaining step is repeated.

Fifth executing step: if the channel number of wireless transmission is the highest transmission channel number, the minimum resistance, the wired transmission bandwidth, and the channel number of wireless transmission of the first adjustable resistor 171 are recorded.

A method of configuring the minimum resistance of the second adjustable resistor 181 is described as follows.

Initial value setting step: when the first adjustable resistor 171 has a resistance of 0 and the second adjustable resistor 181 has a resistance of 0, the wired transmission line is closed, and the wireless channel of the output device 14 is set to a lowest transmission channel.

Second original SNR value obtaining step: a wireless transmission output power of the wireless data transmitter 15 is adjusted, so that a received signal strength indication (RSSI) of a wireless signal received by the output device 14 is higher than a preset range of wireless reception sensitivity, and then an SNR value of the wireless signal received by the output device 14 is obtained and recorded as a second original SNR value.

In one embodiment, the wireless transmission output power of the wireless data transmitter 15 may be adjusted by controlling the output power of the wireless data transmitter 15 through a wireless channel at a wireless data receiver. An attenuator (not shown) is coupled between the wireless data transmitter and the wireless data receiver.

In one embodiment, the preset range of wireless reception sensitivity is 3-4 dB. The wireless reception sensitivity is obtained according to a design rule of the wireless signal interference reduction device 100.

Second SNR value obtaining step: the wired transmission line where the second adjustable resistor 181 is located is opened, and the wired transmission bandwidth is set to a maximum resistance. With the resistance of the first adjustable resistor 171 set to the maximum resistance, the SNR value of wireless reception is obtained and recorded as the second SNR value.

First determining step: whether a difference between the second original SNR value and the second SNR value is less than or equal to a preset value is determined.

In one embodiment, the preset value is 2 dB.

First executing step: if the difference between the second original SNR value and the second SNR value is greater than the preset value, the resistance of the second adjustable resistor 181 is increased by one step value.

Second executing step: if the difference between the second original SNR value and the second SNR value is less than or equal to the preset value, the resistance of the second adjustable resistor 181 is recorded as the minimum resistance of the first adjustable resistor 171.

Second determining step: after obtaining the minimum resistance of the resistance of the second adjustable resistor 181, whether the wired transmission bandwidth is the lowest is determined.

Third executing step: if the wired transmission bandwidth is not the lowest, the wired transmission bandwidth is reduced by one step value, and the second original SNR value obtaining step is repeated.

Third determining step: if the wired transmission bandwidth is the lowest, whether the channel number of wireless transmission is the highest transmission channel number is determined.

Fourth executing step: if the channel number of wireless transmission is not the highest transmission channel number, the channel number of wireless transmission is increased by one, and the second original SNR value obtaining step is repeated.

Fifth executing step: if the channel number of wireless transmission is the highest transmission channel number, the minimum resistance, the wired transmission bandwidth, and the channel number of wireless transmission of the second adjustable resistor 181 are recorded.

Figure 3:
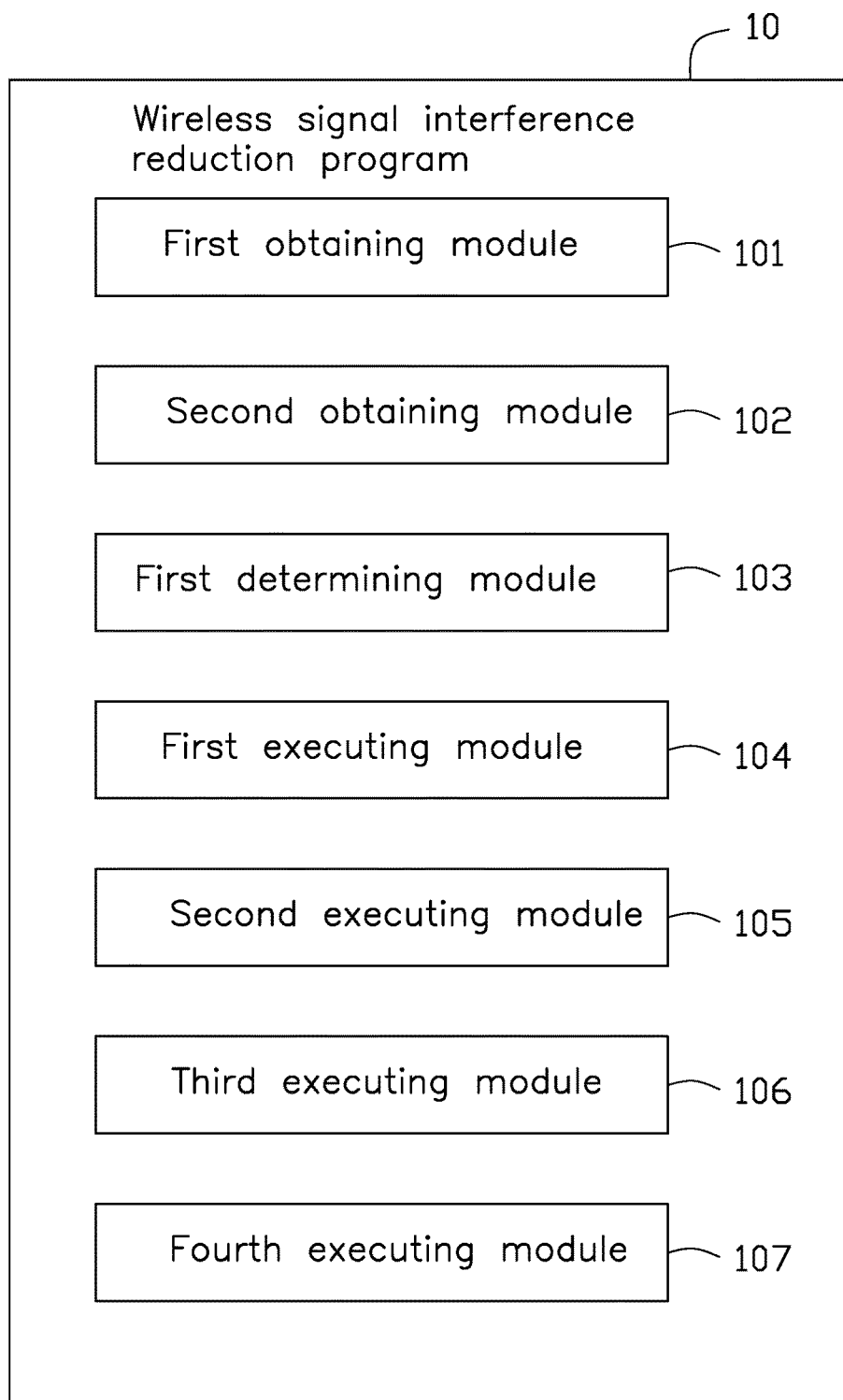
FIG. 3 is a block diagram of functional modules of a wireless signal interference reduction program.

FIG. 3 shows a block diagram of functional modules of a wireless signal interference reduction program 10.

In one embodiment, the wireless signal interference reduction program 10 operates in the wireless signal interference reduction device 100. The functional modules of the wireless signal interference reduction program 10 may include a first obtaining module 101, a second obtaining module 102, a first determining module 103, a first executing module 104, a second executing module 105, a third executing module 106, and a fourth executing module 107.

The first obtaining module 101 obtains a signal to noise ratio (SNR) value of wireless reception under initial conditions and records the obtained SNR value as an initial SNR value.

In one embodiment, the initial conditions are described as follows.

A resistance of the first adjustable resistor 171 is such that a wired transmission error rate is lower than a maximum resistance of an industry standard of wired transmission. A resistance of the second adjustable resistor 181 is such that a wired transmission error rate is lower than a maximum resistance of an industry standard of wired transmission. A wireless transmission channel is set to a transmission channel of a lowest channel number. A wired transmission bandwidth is set to a bandwidth of a corresponding wired transmission when resistances of the first adjustable resistor 171 and the second adjustable resistor 181 are a maximum resistance.

In one embodiment, the first adjustable resistor 171 is coupled in series on the data bus 17 between the baseband chip 12 and the digital signal converter 13, and the second adjustable resistor 181 is coupled in series on the output bus 18 between the digital signal converter 13 and the output device 14.

A method of configuring the maximum resistance of the first adjustable resistor 171 is described as follows.

Initial value setting step: the channel number of wireless transmission is set to the lowest transmission channel when the first adjustable resistor 171 has a resistance of 0 and the second adjustable resistor 181 has a resistance of 0.

First receiving step: a wired transmission line where the first adjustable resistor 171 is located is opened, a wired transmission bandwidth is set to a maximum resistance, and a wired digital signal receiving condition of the digital signal converter 13 is obtained.

First determining step: whether the wired digital signal receiving condition of the digital signal converter 13 is normal is determined.

First executing step: if the wired digital signal receiving condition of the digital signal converter 13 is normal, the resistance of the first adjustable resistor 171 is increased by one step value.

Second executing step: if the wired digital signal receiving condition of the digital signal converter 13 is not normal, the resistance of the first adjustable resistor 171 is decreased by one step value and set as the maximum resistance of the first adjustable resistor 171.

Second determining step: whether the wired transmission bandwidth of the first adjustable resistor 171 is a minimum resistance is determined.

Third executing step: if the wired transmission bandwidth of the first adjustable resistor 171 is not the minimum resistance, the wired transmission bandwidth is reduced by one step value.

Fourth executing step: if the wired transmission bandwidth is the minimum resistance, the maximum resistance and the wired transmission bandwidth of the first adjustable resistor 171 are recorded.

In one embodiment, the digital signal converter 13 may be a High Definition Multimedia Interface (HDMI) digital signal converter. Whether the wired digital signal receiving condition of the digital signal converter 13 is normal is determined by a detection program of a verification module having a data detection function. The digital transmission signal of the wired transmission line is detected to determine whether the receiving condition is normal.

In another embodiment, the digital signal converter 13 may be a Video Graphics Array (VGA) digital signal converter, and whether the wired digital signal receiving condition of the digital signal converter 13 is normal is determined by a sensor.

In one embodiment, a method of configuring the maximum resistance of the second adjustable resistor 181 is described as follows.

Initial value setting step: when the first adjustable resistor 171 has a resistance of 0 and the second adjustable resistor 181 has a resistance of 0, a number of channels for wireless transmission is set to a lowest number.

First receiving step: a wired transmission line where the second adjustable resistor 181 is located is opened, and a wired transmission bandwidth is set to a maximum resistance. A wired digital signal receiving condition of the output device 14 is obtained at a maximum resistance of the first adjustable resistor 171.

First determining step: whether the wired digital signal receiving condition of the output device 14 is normal is determined.

First executing step: if the wired digital signal receiving condition of the output device 14 is normal, the resistance of the second adjustable resistor 181 is increased by one step value.

Second executing step: if the wired digital signal receiving condition of the output device 14 is not normal, the resistance of the second adjustable resistor 181 is reduced by one step value and set as a maximum resistance of the second adjustable resistor 181.

Second determining step: whether the wired transmission bandwidth of the second adjustable resistor 181 is a minimum resistance is determined.

Third executing step: if the wired transmission bandwidth of the second adjustable resistor 181 is not the minimum resistance, the wired transmission bandwidth is reduced by one step value.

Fourth executing step: if the wired transmission bandwidth of the second adjustable resistor 181 is the minimum resistance, the maximum resistance and the wired transmission bandwidth of the second adjustable resistor 181 are recorded.

In one embodiment, the output device 14 may be a display or an electronic device having a display, such as a smart phone, a tablet computer, a laptop computer, a desktop computer, or the like. The method for determining whether the wired digital signal receiving condition of the output device 14 is normal may be determined by using a sensor, or may be determined by a verification module having a data detection function.

The second obtaining module 102 obtains an SNR value of wireless reception, a data reception status of the digital signal converter 13, and a data reception status of the output device 14 in real-time at a preset interval when wired data transmission is turned on. The obtained SNR value is recorded as a real-time SNR value.

In one embodiment, the preset interval is 30 seconds, and the SNR value of wireless reception may be obtained through a data control interface calling program.

The first determining module 103 determines whether a difference between the initial SNR value and the real-time SNR value is less than a preset value, whether the data reception status of the digital signal converter 13 is normal, and whether the data reception status of the output device 14 is normal.

In one embodiment, the preset value is 2 dB. When the difference between the initial SNR value and the real-time SNR value is less than or equal to 2 dB, the wired digital signal has a reduced interference on the wireless signal.

The first executing module 104 continuously obtains the real-time SNR value at the preset interval to obtain the difference between the initial SNR value and the real-time SNR value if the difference between the initial SNR value and the real-time SNR value is less than the preset value, the data receiving condition of the digital signal converter 13 is normal, and the data receiving condition of the output device 14 is normal.

For example, the preset value is 2 dB, the digital signal converter 13 is an HDMI digital signal converter, the output device 14 is a display, and the preset interval is 30 s. If the difference between the initial SNR value and the real-time SNR value is less than 2 dB, the wired digital signal received by the digital signal converter 13 through a first sensor is normal, the wired digital signal received by the output device 14 through a second sensor is normal, and block S3 is implemented every 30 seconds.

The second executing module 105 reduces the resistance of the first adjustable resistor 171 by one step value if the data receiving condition of the digital signal converter 13 is not normal.

The third executing module 106 reduces the wired transmission bandwidth by one step value if the difference between the initial SNR value and the real-time SNR value is not less than the preset value.

The fourth executing module 107 reduces the resistance of the second adjustable resistor 181 by one step value if the receiving condition of the output device 14 is not normal.

In one embodiment, if the resistance of the first adjustable resistor 171 and the resistance of the second adjustable resistor 181 are already the minimum resistance and if the data receiving condition of the digital signal converter 13 is not normal, the channel for wireless transmission is switched.

If the resistance of the first adjustable resistor 171 and the resistance of the second adjustable resistor 181 are already the minimum resistance and the receiving condition of the output device 14 is not normal, it is determined that the transmission line is too long or the output device 14 is faulty.

A method of configuring the minimum resistance of the first adjustable resistor 171 is described as follows.

Initial value setting step: when the first adjustable resistor 171 has a resistance of 0 and the second adjustable resistor 181 has a resistance of 0, the wired transmission line is closed, and the wireless channel of the digital signal converter 13 is set to a lowest transmission channel.

First original SNR value obtaining step: a wireless transmission output power of the wireless data transmitter 15 is adjusted, so that a received signal strength indication (RSSI) of a wireless signal received by the digital signal converter 13 is higher than a preset range of wireless reception sensitivity, and then an SNR value of the wireless signal received by the digital signal converter 13 is obtained and recorded as a first original SNR value.

In one embodiment, the wireless transmission output power of the wireless data transmitter 15 may be adjusted by controlling the output power of the wireless data transmitter 15 through a wireless channel at a wireless data receiver. An attenuator (not shown) is coupled between the wireless data transmitter and the wireless data receiver.

In one embodiment, the preset range of wireless reception sensitivity is 3-4 dB. The wireless reception sensitivity is obtained according to a design rule of the wireless signal interference reduction device 100.

First SNR value obtaining step: the wired transmission line where the first adjustable resistor 171 is located is opened, a wired transmission bandwidth is set to a maximum resistance, and an SNR value of wireless reception is obtained and recorded as a first SNR value.

First determining step: whether a difference between the first original SNR value and the first SNR value is less than or equal to a preset value is determined.

In one embodiment, the preset value is 2 dB.

First executing step: if the difference between the first original SNR value and the first SNR value is greater than the preset value, the resistance of the first adjustable resistor 171 is increased by one step value.

Second executing step: if the difference between the first original SNR value and the first SNR value is less than or equal to the preset value, the resistance of the first adjustable resistor 171 is recorded as the minimum resistance of the first adjustable resistor 171.

Second determining step: after obtaining the minimum resistance of the resistance of the first adjustable resistor 171, whether the wired transmission bandwidth is the lowest is determined.

Third executing step: if the wired transmission bandwidth is not the lowest, the wired transmission bandwidth is reduced by one step value, and the first SNR value obtaining step is repeated.

Third determining step: if the wired transmission bandwidth is the lowest, whether the channel number of wireless transmission is the highest transmission channel number is determined.

Fourth executing step: if the channel number of wireless transmission is not the highest transmission channel number, the channel number of wireless transmission is increased by one, and the first original SNR value obtaining step is repeated.

Fifth executing step: if the channel number of wireless transmission is the highest transmission channel number, the minimum resistance, the wired transmission bandwidth, and the channel number of wireless transmission of the first adjustable resistor 171 are recorded.

A method of configuring the minimum resistance of the second adjustable resistor 181 is described as follows.

Initial value setting step: when the first adjustable resistor 171 has a resistance of 0 and the second adjustable resistor 181 has a resistance of 0, the wired transmission line is closed, and the wireless channel of the output device 14 is set to a lowest transmission channel.

Second original SNR value obtaining step: a wireless transmission output power of the wireless data transmitter 15 is adjusted, so that a received signal strength indication (RSSI) of a wireless signal received by the output device 14 is higher than a preset range of wireless reception sensitivity, and then an SNR value of the wireless signal received by the output device 14 is obtained and recorded as a second original SNR value.

In one embodiment, the wireless transmission output power of the wireless data transmitter 15 may be adjusted by controlling the output power of the wireless data transmitter 15 through a wireless channel at a wireless data receiver. An attenuator (not shown) is coupled between the wireless data transmitter and the wireless data receiver.

In one embodiment, the preset range of wireless reception sensitivity is 3-4 dB. The wireless reception sensitivity is obtained according to a design rule of the wireless signal interference reduction device 100.

Second SNR value obtaining step: the wired transmission line where the second adjustable resistor 181 is located is opened, and the wired transmission bandwidth is set to a maximum resistance. With the resistance of the first adjustable resistor 171 set to the maximum resistance, the SNR value of wireless reception is obtained and recorded as the second SNR value.

First determining step: whether a difference between the second original SNR value and the second SNR value is less than or equal to a preset value is determined.

In one embodiment, the preset value is 2 dB.

First executing step: if the difference between the second original SNR value and the second SNR value is greater than the preset value, the resistance of the second adjustable resistor 181 is increased by one step value.

Second executing step: if the difference between the second original SNR value and the second SNR value is less than or equal to the preset value, the resistance of the second adjustable resistor 181 is recorded as the minimum resistance of the first adjustable resistor 171.

Second determining step: after obtaining the minimum resistance of the resistance of the second adjustable resistor 181, whether the wired transmission bandwidth is the lowest is determined.

Third executing step: if the wired transmission bandwidth is not the lowest, the wired transmission bandwidth is reduced by one step value, and the second original SNR value obtaining step is repeated.

Third determining step: if the wired transmission bandwidth is the lowest, whether the channel number of wireless transmission is the highest transmission channel number is determined.

Fourth executing step: if the channel number of wireless transmission is not the highest transmission channel number, the channel number of wireless transmission is increased by one, and the second original SNR value obtaining step is repeated.

Fifth executing step: if the channel number of wireless transmission is the highest transmission channel number, the minimum resistance, the wired transmission bandwidth, and the channel number of wireless transmission of the second adjustable resistor 181 are recorded.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A wireless signal interference reduction method implemented in a wireless electronic device comprising a digital signal converter, an output device, a first adjustable resistor, and a second adjustable resistor, the method comprising:
    obtaining a signal to noise ratio (SNR) value of wireless reception under initial conditions and recording the obtained SNR value as an initial SNR value;
    obtaining an SNR value of wireless reception, a data reception status of the digital signal converter, and a data reception status of the output device in real-time at a preset interval when wired data transmission is turned on, and recording the SNR value as a real-time SNR value;
    determining whether a difference between the initial SNR value and the real-time SNR value is less than a preset value, whether the data reception status of the digital signal converter is normal, and whether the data reception status of the output device is normal;
    continuously obtaining the real-time SNR value at the preset interval to obtain the difference between the initial SNR value and the real-time SNR value, wherein if the difference between the initial SNR value and the real-time SNR value is less than the preset value, the data receiving condition of the digital signal converter is normal, and the data receiving condition of the output device is normal;
    reducing the resistance of the first adjustable resistor by one step value if the data receiving condition of the digital signal converter is not normal;
    reducing the wired transmission bandwidth by one step value if the difference between the initial SNR value and the real-time SNR value is not less than the preset value; and
    reducing the resistance of the second adjustable resistor by one step value if the receiving condition of the output device is not normal.

2. The wireless signal interference reduction method of claim 1, the wireless electronic device further comprising a baseband chip, wherein:
    the first adjustable resistor is coupled in series on a data bus between the baseband chip and the digital signal converter; and
    the second adjustable resistor is coupled in series on an output bus between the digital signal converter and the output device.

3. The wireless signal interference reduction method of claim 1, wherein the initial conditions comprise:
    a resistance of the first adjustable resistor is such that a wired transmission error rate is lower than a maximum resistance of an industry standard of wired transmission;
    a resistance of the second adjustable resistor is such that a wired transmission error rate is lower than the maximum resistance of an industry standard of wired transmission;

a wireless transmission channel is set to a transmission channel of a lowest channel number; and a wired transmission bandwidth is set to a bandwidth of a corresponding wired transmission when a resistance of each of the first adjustable resistor and the second adjustable resistor is at the maximum resistance.

4. The wireless signal interference reduction method of claim 1, further comprising:

switching the channel for wireless transmission if the data receiving condition of the digital signal converter is not normal and the resistance of each of the first adjustable resistor and the second adjustable resistor is at a minimum resistance; and determining that the transmission line is too long or the output device is faulty if the resistance of the first adjustable resistor and the resistance of the second adjustable resistor are at the minimum resistance and the receiving condition of the output device is not normal.

5. The wireless signal interference reduction method of claim 4, wherein the minimum resistance of the first adjustable resistor is configured by:

initial value setting step: when the first adjustable resistor has a resistance of 0 and the second adjustable resistor has a resistance of 0, the wired transmission line is closed, and the wireless channel of the digital signal converter is set to a lowest transmission channel;

first original SNR value obtaining step: a wireless transmission output power of a wireless data transmitter is adjusted, so that a received signal strength indication (RSSI) of a wireless signal received by the digital signal converter is higher than a preset range of wireless reception sensitivity, and then an SNR value of the wireless signal received by the digital signal converter is obtained and recorded as a first original SNR value;

first SNR value obtaining step: the wired transmission line where the first adjustable resistor is located is opened, a wired transmission bandwidth is set to the maximum resistance, and an SNR value of wireless reception is obtained and recorded as a first SNR value;

first determining step: whether a difference between the first original SNR value and the first SNR value is less than or equal to a preset value is determined;

first executing step: if the difference between the first original SNR value and the first SNR value is greater than the preset value, the resistance of the first adjustable resistor is increased by one step value;

second executing step: if the difference between the first original SNR value and the first SNR value is less than or equal to the preset value, the resistance of the first adjustable resistor is recorded as the minimum resistance of the first adjustable resistor;

second determining step: after obtaining the minimum resistance of the resistance of the first adjustable resistor, whether the wired transmission bandwidth is the lowest is determined;

third executing step: if the wired transmission bandwidth is not the lowest, the wired transmission bandwidth is reduced by one step value, and the first SNR value obtaining step is repeated;

third determining step: if the wired transmission bandwidth is the lowest, whether the channel number of wireless transmission is the highest transmission channel number is determined;

fourth executing step: if the channel number of wireless transmission is not the highest transmission channel number, the channel number of wireless transmission is increased by one, and the first original SNR value obtaining step is repeated; and fifth executing step: if the channel number of wireless transmission is the highest transmission channel number, the minimum resistance, the wired transmission bandwidth, and the channel number of wireless transmission of the first adjustable resistor are recorded.

6. The wireless signal interference reduction method of claim 5, wherein the wireless transmission output power of the wireless data transmitter is adjusted by:

controlling the output power of the wireless data transmitter through a wireless channel at a wireless data receiver;

wherein an attenuator is coupled between the wireless data transmitter and the wireless data receiver.

7. The wireless signal interference reduction method of claim 4, wherein a maximum resistance of the first adjustable resistor is configured by:

initial value setting step: the channel number of wireless transmission is set to a lowest transmission channel when the first adjustable resistor has a resistance of 0 and the second adjustable resistor has a resistance of 0;

first receiving step: a wired transmission line where the first adjustable resistor is located is opened, a wired transmission bandwidth is set to a maximum resistance, and a wired digital signal receiving condition of the digital signal converter is obtained;

first determining step: whether the wired digital signal receiving condition of the digital signal converter is normal is determined;

first executing step: if the wired digital signal receiving condition of the digital signal converter is normal, the resistance of the first adjustable resistor is increased by one step value;

second executing step: if the wired digital signal receiving condition of the digital signal converter is not normal, the resistance of the first adjustable resistor is decreased by one step value and set as the maximum resistance of the first adjustable resistor;

second determining step: whether the wired transmission bandwidth of the first adjustable resistor is a minimum resistance is determined;

third executing step: if the wired transmission bandwidth of the first adjustable resistor is not the minimum resistance, the wired transmission bandwidth is reduced by one step value; and fourth executing step: if the wired transmission bandwidth is the minimum resistance, the maximum resistance and the wired transmission bandwidth of the first adjustable resistor are recorded.

8. The wireless signal interference reduction method of claim 4, wherein the minimum resistance of the second adjustable resistor is configured by:

initial value setting step: when the first adjustable resistor has a resistance of 0 and the second adjustable resistor has a resistance of 0, the wired transmission line is closed, and the wireless channel of the output device is set to a lowest transmission channel;

second original SNR value obtaining step: a wireless transmission output power of the wireless data transmitter is adjusted, so that a received signal strength indication (RSSI) of a wireless signal received by the output device is higher than a preset range of wireless reception sensitivity, and then an SNR value of the wireless signal received by the output device is obtained and recorded as a second original SNR value;

second SNR value obtaining step: the wired transmission line where the second adjustable resistor is located is opened, and the wired transmission bandwidth is set to a maximum resistance; with the resistance of the first adjustable resistor set to the maximum resistance, the SNR value of wireless reception is obtained and recorded as the second SNR value;

first determining step: whether a difference between the second original SNR value and the second SNR value is less than or equal to a preset value is determined;

first executing step: if the difference between the second original SNR value and the second SNR value is greater than the preset value, the resistance of the second adjustable resistor is increased by one step value;

second executing step: if the difference between the second original SNR value and the second SNR value is less than or equal to the preset value, the resistance of the second adjustable resistor is recorded as the minimum resistance of the first adjustable resistor;

second determining step: after obtaining the minimum resistance of the resistance of the second adjustable resistor, whether the wired transmission bandwidth is the lowest is determined;

third executing step: if the wired transmission bandwidth is not the lowest, the wired transmission bandwidth is reduced by one step value, and the second original SNR value obtaining step is repeated;

third determining step: if the wired transmission bandwidth is the lowest, whether a channel number of wireless transmission is a highest transmission channel number is determined;

fourth executing step: if the channel number of wireless transmission is not the highest transmission channel number, the channel number of wireless transmission is increased by one, and the second original SNR value obtaining step is repeated; and fifth executing step: if the channel number of wireless transmission is the highest transmission channel number, the minimum resistance, the wired transmission bandwidth, and the channel number of wireless transmission of the second adjustable resistor are recorded.

9. The wireless signal interference reduction method of claim 4, wherein a maximum resistance of the second resistor is configured by:

initial value setting step: when the first adjustable resistor has a resistance of 0 and the second adjustable resistor has a resistance of 0, a number of channels for wireless transmission is set to a lowest number;

first receiving step: a wired transmission line where the second adjustable resistor is located is opened, and a wired transmission bandwidth is set to a maximum resistance;

a wired digital signal receiving condition of the output device is obtained at a maximum resistance of the first adjustable resistor;

first determining step: whether the wired digital signal receiving condition of the output device is normal is determined;

first executing step: if the wired digital signal receiving condition of the output device is normal, the resistance of the second adjustable resistor is increased by one step value;

second executing step: if the wired digital signal receiving condition of the output device is not normal, the resistance of the second adjustable resistor is reduced by one step value and set as a maximum resistance of the second adjustable resistor;

second determining step: whether the wired transmission bandwidth of the second adjustable resistor is a minimum resistance is determined;

third executing step: if the wired transmission bandwidth of the second adjustable resistor is not the minimum resistance, the wired transmission bandwidth is reduced by one step value; and fourth executing step: if the wired transmission bandwidth of the second adjustable resistor is the minimum resistance, the maximum resistance and the wired transmission bandwidth of the second adjustable resistor are recorded.

10. A wireless signal interference reduction device comprising:
a digital signal converter;
an output device;
a first adjustable resistor; and
a second adjustable resistor; wherein the wireless signal interference reduction device is configured for:
obtaining a signal to noise ratio (SNR) value of wireless reception under initial conditions and recording the obtained SNR value as an initial SNR value;
obtaining an SNR value of wireless reception, a data reception status of the digital signal converter, and a data reception status of the output device in real-time at a preset interval when wired data transmission is turned on, and recording the SNR value as a real-time SNR value;
determining whether a difference between the initial SNR value and the real-time SNR value is less than a preset value, whether the data reception status of the digital signal converter is normal, and whether the data reception status of the output device is normal;
continuously obtaining the real-time SNR value at the preset interval to obtain the difference between the initial SNR value and the real-time SNR value, wherein if the difference between the initial SNR value and the real-time SNR value is less than the preset value, the data receiving condition of the digital signal converter is normal, and the data receiving condition of the output device is normal;
reducing the resistance of the first adjustable resistor by one step value if the data receiving condition of the digital signal converter is not normal;
reducing the wired transmission bandwidth by one step value if the difference between the initial SNR value and the real-time SNR value is not less than the preset value; and
reducing the resistance of the second adjustable resistor by one step value if the receiving condition of the output device is not normal.

11. The wireless signal interference reduction device of claim 10, further comprising a baseband chip, wherein:
the first adjustable resistor is coupled in series on a data bus between the baseband chip and the digital signal converter; and
the second adjustable resistor is coupled in series on an output bus between the digital signal converter and the output device.

12. The wireless signal interference reduction device of claim 10, wherein the initial conditions comprise:

a resistance of the first adjustable resistor is such that a wired transmission error rate is lower than a maximum resistance of an industry standard of wired transmission;
a resistance of the second adjustable resistor is such that a wired transmission error rate is lower than the maximum resistance of an industry standard of wired transmission;
a wireless transmission channel is set to a transmission channel of a lowest channel number; and
a wired transmission bandwidth is set to a bandwidth of a corresponding wired transmission when a resistance of each of the first adjustable resistor and the second adjustable resistor is at the maximum resistance.

13. The wireless signal interference reduction device of claim 10, wherein the method implemented by the wireless signal interference reduction device further comprises:
switching the channel for wireless transmission if the data receiving condition of the digital signal converter is not normal and the resistance of the first adjustable resistor and the resistance of the second adjustable resistor are at the minimum resistance; and
determining that the transmission line is too long or the output device is faulty if the resistance of the first adjustable resistor and the resistance of the second adjustable resistor are at the minimum resistance and the receiving condition of the output device is not normal.

14. The wireless signal interference reduction device of claim 13, wherein the minimum resistance of the first adjustable resistor is configured by:
initial value setting function: when the first adjustable resistor has a resistance of 0 and the second adjustable resistor has a resistance of 0, the wired transmission line is closed, and the wireless channel of the digital signal converter is set to a lowest transmission channel;
first original SNR value obtaining function: a wireless transmission output power of a wireless data transmitter is adjusted, so that a received signal strength indication (RSSI) of a wireless signal received by the digital signal converter is higher than a preset range of wireless reception sensitivity, and then an SNR value of the wireless signal received by the digital signal converter is obtained and recorded as a first original SNR value;
first SNR value obtaining function: the wired transmission line where the first adjustable resistor is located is opened, a wired transmission bandwidth is set to the maximum resistance, and an SNR value of wireless reception is obtained and recorded as a first SNR value;
first determining function: whether a difference between the first original SNR value and the first SNR value is less than or equal to a preset value is determined;
first executing function: if the difference between the first original SNR value and the first SNR value is greater than the preset value, the resistance of the first adjustable resistor is increased by one step value;
second executing function: if the difference between the first original SNR value and the first SNR value is less than or equal to the preset value, the resistance of the first adjustable resistor is recorded as the minimum resistance of the first adjustable resistor;
second determining function: after obtaining the minimum resistance of the resistance of the first adjustable resistor, whether the wired transmission bandwidth is the lowest is determined;
third executing function: if the wired transmission bandwidth is not the lowest, the wired transmission bandwidth is reduced by one step value, and the first SNR value obtaining function is repeated;
third determining function: if the wired transmission bandwidth is the lowest, whether the channel number of wireless transmission is the highest transmission channel number is determined;
fourth executing function: if the channel number of wireless transmission is not the highest transmission channel number, the channel number of wireless transmission is increased by one, and the first original SNR value obtaining function is repeated; and
fifth executing function: if the channel number of wireless transmission is the highest transmission channel number, the minimum resistance, the wired transmission bandwidth, and the channel number of wireless transmission of the first adjustable resistor are recorded.

15. The wireless signal interference reduction device of claim 14, wherein the wireless transmission output power of the wireless data transmitter is adjusted by:
controlling the output power of the wireless data transmitter through a wireless channel at a wireless data receiver;
wherein an attenuator is coupled between the wireless data transmitter and the wireless data receiver.

16. The wireless signal interference reduction device of claim 13, wherein a maximum resistance of the first adjustable resistor is configured by:
initial value setting function: the channel number of wireless transmission is set to the lowest transmission channel when the first adjustable resistor has a resistance of 0 and the second adjustable resistor has a resistance of 0;
first receiving function: a wired transmission line where the first adjustable resistor is located is opened, a wired transmission bandwidth is set to a maximum resistance, and a wired digital signal receiving condition of the digital signal converter is obtained;
first determining function: whether the wired digital signal receiving condition of the digital signal converter is normal is determined;
first executing function: if the wired digital signal receiving condition of the digital signal converter is normal, the resistance of the first adjustable resistor is increased by one step value;
second executing function: if the wired digital signal receiving condition of the digital signal converter is not normal, the resistance of the first adjustable resistor is decreased by one step value and set as the maximum resistance of the first adjustable resistor;
second determining function: whether the wired transmission bandwidth of the first adjustable resistor is a minimum resistance is determined;
third executing function: if the wired transmission bandwidth of the first adjustable resistor is not the minimum resistance, the wired transmission bandwidth is reduced by one step value; and
fourth executing function: if the wired transmission bandwidth is the minimum resistance, the maximum resistance and the wired transmission bandwidth of the first adjustable resistor are recorded.

17. The wireless signal interference reduction device of claim 13, wherein the minimum resistance of the second adjustable resistor is configured by:
initial value setting function: when the first adjustable resistor has a resistance of 0 and the second adjustable resistor has a resistance of 0, the wired transmission line is closed, and the wireless channel of the output device is set to a lowest transmission channel;

second original SNR value obtaining function: a wireless transmission output power of the wireless data transmitter is adjusted, so that a received signal strength indication (RSSI) of a wireless signal received by the output device is higher than a preset range of wireless reception sensitivity, and then an SNR value of the wireless signal received by the output device is obtained and recorded as a second original SNR value;

second SNR value obtaining function: the wired transmission line where the second adjustable resistor is located is opened, and the wired transmission bandwidth is set to a maximum resistance; with the resistance of the first adjustable resistor set to the maximum resistance, the SNR value of wireless reception is obtained and recorded as the second SNR value;

first determining function: whether a difference between the second original SNR value and the second SNR value is less than or equal to a preset value is determined;

first executing function: if the difference between the second original SNR value and the second SNR value is greater than the preset value, the resistance of the second adjustable resistor is increased by one step value;

second executing function: if the difference between the second original SNR value and the second SNR value is less than or equal to the preset value, the resistance of the second adjustable resistor is recorded as the minimum resistance of the first adjustable resistor;

second determining function: after obtaining the minimum resistance of the resistance of the second adjustable resistor, whether the wired transmission bandwidth is the lowest is determined;

third executing function: if the wired transmission bandwidth is not the lowest, the wired transmission bandwidth is reduced by one step value, and the second original SNR value obtaining function is repeated;

third determining function: if the wired transmission bandwidth is the lowest, whether a channel number of wireless transmission is a highest transmission channel number is determined;

fourth executing function: if the channel number of wireless transmission is not the highest transmission channel number, the channel number of wireless transmission is increased by one, and the second original SNR value obtaining function is repeated; and fifth executing function: if the channel number of wireless transmission is the highest transmission channel number, the minimum resistance, the wired transmission bandwidth, and the channel number of wireless transmission of the second adjustable resistor are recorded.

18. The wireless signal interference reduction device of claim 13, wherein a maximum resistance of the second resistor is configured by:

initial value setting function: when the first adjustable resistor has a resistance of 0 and the second adjustable resistor has a resistance of 0, a number of channels for wireless transmission is set to a lowest number;

first receiving function: a wired transmission line where the second adjustable resistor is located is opened, and a wired transmission bandwidth is set to a maximum resistance; a wired digital signal receiving condition of the output device is obtained at a maximum resistance of the first adjustable resistor;

first determining function: whether the wired digital signal receiving condition of the output device is normal is determined;

first executing function: if the wired digital signal receiving condition of the output device is normal, the resistance of the second adjustable resistor is increased by one step value;

second executing function: if the wired digital signal receiving condition of the output device is not normal, the resistance of the second adjustable resistor is reduced by one step value and set as a maximum resistance of the second adjustable resistor;

second determining function: whether the wired transmission bandwidth of the second adjustable resistor is a minimum resistance is determined;

third executing function: if the wired transmission bandwidth of the second adjustable resistor is not the minimum resistance, the wired transmission bandwidth is reduced by one step value; and fourth executing function: if the wired transmission bandwidth of the second adjustable resistor is the minimum resistance, the maximum resistance and the wired transmission bandwidth of the second adjustable resistor are recorded.

* * * * *